United States Patent
Kai et al.

(10) Patent No.: US 12,002,988 B2
(45) Date of Patent: Jun. 4, 2024

(54) POROUS FILM INCLUDING POROUS BASE AND POROUS LAYER HAVING INORGANIC PARTICLES AND RESIN PARTICLES CONTAINING FLUORO (METH)ACRYLATE-CONTAINING OR SILICON-CONTAINING POLYMER, SEPARATOR FOR SECONDARY BATTERIES, AND SECONDARY BATTERY

(71) Applicant: Toray Industries, Inc., Tokyo (JP)

(72) Inventors: Nobuyasu Kai, Otsu (JP); Keiichi Kamon, Otsu (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 264 days.

(21) Appl. No.: 17/294,874

(22) PCT Filed: Nov. 20, 2019

(86) PCT No.: PCT/JP2019/045403
§ 371 (c)(1),
(2) Date: May 18, 2021

(87) PCT Pub. No.: WO2020/105672
PCT Pub. Date: May 28, 2020

(65) Prior Publication Data
US 2022/0013861 A1     Jan. 13, 2022

(30) Foreign Application Priority Data

Nov. 22, 2018 (JP) ................................. 2018-218807
Mar. 29, 2019 (JP) ................................. 2019-066407
Aug. 30, 2019 (JP) ................................. 2019-157556

(51) Int. Cl.
  H01M 50/446    (2021.01)
  H01M 50/443    (2021.01)
  H01M 50/489    (2021.01)
  H01M 50/491    (2021.01)

(52) U.S. Cl.
  CPC ....... H01M 50/446 (2021.01); H01M 50/443 (2021.01); H01M 50/489 (2021.01); H01M 50/491 (2021.01)

(58) Field of Classification Search
  CPC ............. H01M 50/446; H01M 50/489; H01M 50/491; H01M 50/443
  USPC .......................................... 429/122, 251, 254
  See application file for complete search history.

(56) References Cited

U.S. PATENT DOCUMENTS

| | | |
|---|---|---|
| 2012/0301774 A1 | 11/2012 | Jiang et al. |
| 2013/0130092 A1 | 5/2013 | Roth et al. |
| 2014/0147726 A1 | 5/2014 | Toyoda |
| 2014/0272523 A1 | 9/2014 | Otsuka et al. |
| 2015/0236323 A1 | 8/2015 | Honda et al. |
| 2015/0333308 A1 | 11/2015 | Toyoda et al. |
| 2016/0079007 A1* | 3/2016 | Otsuka ................... H01M 50/42 526/318.4 |
| 2016/0268565 A1* | 9/2016 | Sasaki ................ H01M 50/461 |
| 2017/0200932 A1 | 7/2017 | Sasaki et al. |
| 2018/0327639 A1 | 11/2018 | Tanaka et al. |
| 2018/0351149 A1 | 12/2018 | Akiike et al. |
| 2019/0106521 A1 | 4/2019 | Takamatsu |
| 2019/0157680 A1 | 5/2019 | Asano |
| 2020/0067047 A1 | 2/2020 | Sugimoto |

FOREIGN PATENT DOCUMENTS

| | | | |
|---|---|---|---|
| CN | 102244223 A | 11/2011 | |
| CN | 103390741 A | 11/2012 | |
| CN | 103026530 A | 4/2013 | |
| CN | 105518905 A | 4/2016 | |
| EP | 2624338 A1 * | 8/2013 | ............. H01G 11/28 |
| EP | 3 046 163 A1 | 7/2016 | |
| JP | 2014222649 A * | 11/2014 | |
| JP | 2016-225297 A | 12/2016 | |
| JP | 6191597 B2 | 8/2017 | |
| JP | 6217129 | 10/2017 | |
| KR | 2016043768 A * | 4/2016 | |
| WO | 2013/058119 A1 | 4/2013 | |
| WO | 2013/133074 A1 | 9/2013 | |
| WO | WO-2014196436 A1 * | 12/2014 | .......... H01M 2/1653 |
| WO | WO-2015029939 A1 * | 3/2015 | ........ H01M 10/0566 |
| WO | 2015/198534 A1 | 12/2015 | |
| WO | 2017/094250 A1 | 6/2017 | |
| WO | 2017/094252 A1 | 6/2017 | |
| WO | 2017/183641 | 10/2017 | |
| WO | 2017/195563 | 11/2017 | |
| WO | 2018/034094 A1 | 2/2018 | |

OTHER PUBLICATIONS

Extended European Search Report dated Jul. 20, 2022, of counterpart European Patent Application No. 19887030.5.
First Search Report dated Aug. 23, 2022, of counterpart Chinese Patent Application No. 201980073821.9, partially in English.

* cited by examiner

Primary Examiner — Sean P Cullen
(74) Attorney, Agent, or Firm — DLA Piper LLP (US)

(57) ABSTRACT

A low cost porous film has high thermal dimensional stability and good adhesion with electrodes and also has excellent battery characteristics. The porous film includes a porous base and a porous layer containing particles A and particles B disposed at least on one side thereof, wherein the particles A contain a polymer having at least one selected from the monomer unit group a that consists of fluorine-containing (meth)acrylate monomer units and silicon-containing monomer units whereas the particles B are inorganic particles.

9 Claims, No Drawings

POROUS FILM INCLUDING POROUS BASE AND POROUS LAYER HAVING INORGANIC PARTICLES AND RESIN PARTICLES CONTAINING FLUORO (METH)ACRYLATE-CONTAINING OR SILICON-CONTAINING POLYMER, SEPARATOR FOR SECONDARY BATTERIES, AND SECONDARY BATTERY

TECHNICAL FIELD

This disclosure relates to a porous film, a separator for secondary batteries, and a secondary battery.

BACKGROUND

Secondary batteries such as lithium ion batteries are widely used for portable digital devices such as smartphones, tablets, mobile phones, laptop PCs, digital cameras, digital video cameras, and portable game consoles; portable apparatuses such as electric tools, electric bikes, and electric assisted bicycles; and automotive applications such as electric vehicles, hybrid vehicles, and plug-in hybrid vehicles.

In general, a lithium ion battery contains a positive electrode formed by laying a positive electrode active material on a positive electrode collector and a negative electrode formed by laying a negative electrode active material on a negative electrode collector, with a secondary battery separator and an electrolyte interposed between them.

A polyolefin based porous base is used in secondary battery separators. Features required of these secondary battery separators include having a porous structure containing an electrolyte to permit ion migration and having a shutdown property that allows electric discharge to be stopped in the event of abnormal heat generation in a lithium ion battery by undergoing thermal melting so that the porous structure will be closed to halt the ion migration.

As lithium ion batteries with larger capacities and larger output are developed in recent years, secondary battery separators are now required to have higher safety characteristics and also have thermal dimensional stability high enough to prevent short-circuiting from being caused by contact between the positive electrode and the negative electrode that can occur when the secondary battery separator undergoes heat shrinkage at high temperatures.

In addition, there are increased demands for separators maintaining strong adhesion with the electrodes before impregnation with electrolyte. This is required to maintain the structure of a layered body composed of a positive electrode, separator, and negative electrode during its conveyance in the secondary battery manufacturing process, to prevent the shape deformation of a layered body composed of a rolled-up positive electrode, separator, and negative electrode when it is inserted in a cylindrical or angular can after being hot-pressed, to achieve an increased energy density by hot pressing such layered bodies so that a larger number of them can be inserted in a can, or to prevent shape deformation of a case containing a laminate type battery.

On the other hand, there are also demands for lithium ion batteries having excellent battery characteristics to realize larger output and longer life, making it necessary to develop products that maintain good battery characteristics without undergoing a decline in its high output characteristics.

It is also required to provide secondary battery separators having such characteristics at low costs.

To meet these demands, Japanese Patent No. 6191597 proposes formation of an adhesion layer on the heat resistant layer to realize both good adhesion with the electrodes and high blocking resistance. International Publication WO 2018/034094 proposes use of polymer particles and inorganic particles that have a particular relation between their particle diameters to realize good adhesion with the electrodes.

As described above, it is necessary to realize good adhesion between the electrodes and the separator by performing a hot pressing step in the secondary battery production process. Excellent battery characteristics are also required currently and it is necessary to develop a low cost process of ensuring high thermal dimensional stability and good adhesion while realizing both high output characteristics and long life with good battery characteristics.

It could therefore be helpful to provide, at low cost, a porous film that has high thermal dimensional stability and good adhesion with electrodes and also has excellent battery characteristics.

SUMMARY

We found that the test conditions used for the blocking resistance test described in JP '597 and WO '094 are not appropriate, that the technique described in JP '597 fails to achieve a sufficiently high blocking resistance under appropriate test conditions, and that the proposed improvement in blocking resistance leads to insufficient adhesion with the electrodes. We also found that implementation of hot pressing causes swelling of the adhesion layer to fill voids in the electrode active material and separator and, as a result, the porosity decreases and the ion transport rate also decreases, leading to deterioration in battery characteristics. In addition, the secondary battery separator proposed in JP '597 requires large cost to form an adhesive layer on a heat resistant layer, and therefore, it is difficult for the techniques described in JP '597 and WO '094 to achieve required thermal dimensional stability, adhesion, and battery characteristics all at once at low cost.

We thus provide:

(1) A porous film including a porous base and a porous layer containing particles A and particles B disposed at least on one side thereof, wherein the particles A contain a polymer having at least one selected from the monomer unit group a that consists of fluorine-containing (meth)acrylate monomer units and silicon-containing monomer units whereas the particles B are inorganic particles.

(2) A porous film as set forth in paragraph (1), wherein the particles B present in the porous layer account for 70 mass % or more and 95 mass % or less of the total quantity, which accounts for 100 mass %, of all constituent components of the porous film.

(3) A porous film as set forth in either paragraph (1) or (2), wherein the particles A are organic resin particles.

(4) A porous film as set forth in any one of paragraphs (1) to (3), wherein the monomer units selected from the monomer unit group a and present in the particles A account for 10 mass % or more and 100 mass % or less.

(5) A porous film as set forth in any of paragraphs (1) to (4), wherein the particles A are particles containing a polymer having a fluorine-containing (meth)acrylate monomer unit.

(6) A porous film as set forth in any of paragraphs (1) to (5), wherein the fluorine-containing (meth)acrylate monomer present in the fluorine-containing (meth) acrylate monomer unit has 3 or more and 13 or less fluorine atoms.

(7) A porous film as set forth in any one of paragraphs (1) to (6), wherein the ratio of change in air permeability between before and after immersion for 24 hours in a solvent containing at least one of dimethyl carbonate, ethyl methyl carbonate, and diethyl carbonate at 25° C. is 1.0 or more and 3.0 or less.

(8) A porous film as set forth in any one of paragraphs (1) to (7), wherein the particles A are made of a copolymer of at least one monomer unit selected from the monomer unit group a and at least one monomer unit selected from a monomer unit group b that consists of unsaturated carboxylic acid monomer units, acrylate monomer units, methacrylate monomer units, styrene based monomer units, olefin based monomer units, diene based monomer units, and amide based monomer units.

(9) A porous film as set forth in any one of paragraphs (1) to (8), wherein the particles A contains a crosslinking agent accounting for 1 mass % or more and 10 mass % or less.

(10) A porous film as set forth in any one of (1) to (9), wherein the thickness of the porous layers is more than 1.0 μm and 8.0 μm or less.

(11) A secondary battery separator including a porous film as set forth in any one of paragraphs (1) to (10).

(12) A secondary battery including a secondary battery separator as set forth in (11).

We provide, at low cost, a secondary battery having high thermal dimensional stability and good adhesion with electrodes and also having excellent battery characteristics, which can be realized by using a porous film including a porous base and a porous layer containing particles A and particles B disposed at least on one side thereof, wherein the particles A contain a polymer having at least one selected from the monomer unit group a that consists of fluorine-containing (meth)acrylate monomer units and silicon-containing monomer units whereas the particles B are inorganic particles.

DETAILED DESCRIPTION

Our porous film includes a porous base and a porous layer containing particles A and particles B disposed at least on one side thereof, wherein the particles A contain a polymer having at least one selected from the monomer unit group a that consists of fluorine-containing (meth)acrylate monomer units and silicon-containing monomer units whereas the particles B are inorganic particles.

Our films, separators and batteries are described in more detail below.

Porous Layer

Particles A

The porous layer contains particles A. The particles A are particles containing a polymer having at least one selected from the monomer unit group a that consists of fluorine-containing (meth)acrylate monomer units and silicon-containing monomer units. Incorporation of at least one monomer unit selected from the monomer unit group a decreases the surface free energy of the particles A, and when a coating liquid prepared by mixing the particles A and the particles B is spread over a porous base, the particles A will be localized near the surface, leading to improved adhesion between the porous layer and electrodes. (Meth)acrylates refer to acrylates and/or methacrylates.

A fluorine-containing (meth)acrylate monomer unit is a repeating unit formed by polymerizing fluorine-containing (meth)acrylate monomers.

Examples of fluorine-containing (meth)acrylate monomers include 2,2,2-trifluoroethyl (meth)acrylate, 2,2,3,3,3-pentafluoropropyl (meth)acrylate, 2-(perfluorobutyl) ethyl (meth)acrylate, 3-(perfluorobutyl)-2-hydroxypropyl (meth)acrylate, 2-(perfluorohexyl) ethyl (meth)acrylate, 3-perfluorohexyl-2-hydroxypropyl (meth)acrylate, 3-(perfluoro-3-methylbutyl)-2-hydroxypropyl (meth)acrylate, 1H,1H,3H-tetrafluoropropyl (meth)acrylate, 1H,1H,5H-octafluoropentyl (meth)acrylate, 1H,1H,7H-dodecafluoroheptyl (meth)acrylate, 1H-1-(trifluoromethyl) trifluoroethyl (meth)acrylate, 1H,1H,3H-hexafluorobutyl (meth)acrylate, 1,2,2,2-tetrafluoro-1-(trifluoromethyl) ethyl (meth)acrylate, and 2-(perfluorooctyl)ethyl (meth)acrylate. Fluorine-containing (meth)acrylate monomers may be used singly or two or more thereof may be used in combination at an appropriate ratio.

A silicon-containing monomer unit is a repeating unit formed by polymerizing silicon-containing monomers.

Examples of silicon-containing monomers include dialkoxysilanes such as dimethyl dimethoxysilane, dimethyl diethoxysilane, (chloromethyl) (methyl) dimethoxysilane, (chloromethyl) (methyl) diethoxysilane, dimethoxy dimethyl phenyl silane, and trialkoxysilanes such as methyl trimethoxysilane, phenyl trimethoxysilane, methyl triethoxysilane, phenyl triethoxysilane, n-propyl trimethoxysilane, n-propyl triethoxysilane, hexyl trimethoxysilane, hexyl triethoxysilane, and octyl triethoxysilane.

In the monomer unit group a, fluorine-containing (meth)acrylate monomer units are preferred because they serve more effectively to decrease the surface free energy of the particles A. It is preferable for a fluorine-containing (meth)acrylate monomer present in the fluorine-containing (meth)acrylate monomer unit to have 3 or more and 13 or less fluorine atoms. The number is more preferably 3 or more and 11 or less, and still more preferably 3 or more and 9 or less. If it is in the above range, it allows the particles A to have a required surface free energy and at the same time achieve high spreadability. If the number of fluorine atoms is 3 or more, a sufficient decrease in the surface free energy of the particles A is realized to ensure sufficiently strong adhesion with electrodes. If the number of fluorine atoms is 13 or less, a sufficient spreadability on a porous base is ensured to achieve improved productivity.

Generally known methods will be helpful in determining the number of fluorine atoms in a fluorine-containing (meth)acrylate monomer. For example, the porous layer is first removed from the porous film using an organic solvent such as water and alcohol, and the organic solvent such as water and alcohol is evaporated sufficiently by drying to separate the constituent components present in the porous layer. An organic solvent that can dissolve organic resin components is added to the resulting constituent components so that only the organic resin components are dissolved to separate them from the particles B. Following this, the organic solvent is evaporated from the solution containing the dissolved organic resin components to extract only the organic resin components. The resulting organic resin components are subjected to magnetic nuclear resonance ($^1$H-NMR, $^{19}$F-NMR), infrared absorption spectroscopy (IR), X-ray photoelectron spectroscopy (XPS), X-ray fluorescence analysis (EDX), and elemental analysis and the like to measure the intensity of signals that represent the fluorine-containing (meth)acrylate monomer, which is then used for calculation.

The particles A may have a core-shell structure containing a monomer unit selected from the monomer unit group b as core and a monomer unit selected from the monomer unit group a as shell to cover the core. Particles of a core-shell structure may contain those in which the shell partly covers the core with the shell and the core being coexisting, in addition to those in which the shell completely covers the core. They may also be formed of a copolymer containing a monomer unit selected from the monomer unit group a and a copolymerizable monomer unit selected from the monomer unit group b. If they are in the form of a copolymer, it adjusts the surface free energy and glass transition temperature of the particles A in a required range. The monomer unit group b may contain unsaturated carboxylic acid monomer units, acrylate monomer units, methacrylate monomer units, styrene based monomer units, olefin based monomer units, diene based monomer units, and amide based monomer units. Examples of monomers used to form these monomer units include unsaturated carboxylic acids such as acrylic acid, methacrylic acid, and crotonic acid; acrylates such as methyl acrylate, ethyl acrylate, n-propyl acrylate, isopropyl acrylate, n-butyl acrylate, isobutyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, stearyl acrylate, cyclohexyl acrylate, hydroxyethyl acrylate, benzyl acrylate, isobornyl acrylate, dicyclopentanyl acrylate, dicyclopentenyl acrylate, hydroxymethyl acrylate, 2-hydroxyethyl acrylate, 3-hydroxypropyl acrylate, 4-hydroxybutyl acrylate, 5-hydroxypentyl acrylate, 6-hydroxyhexyl acrylate, 7-hydroxyheptyl acrylate, and 8-hydroxyoctyl acrylate; and methacrylates such as methyl methacrylate, ethyl methacrylate, n-propyl methacrylate, isopropyl methacrylate, n-butyl methacrylate, t-butyl methacrylate, isobutyl methacrylate, t-butyl methacrylate, t-butyl cyclohexyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, cyclohexyl methacrylate, hydroxyethyl methacrylate, benzyl methacrylate, isobornyl methacrylate, dicyclopentanyl methacrylate, dicyclopentenyl methacrylate, hydroxymethyl methacrylate, 2-hydroxyethyl methacrylate, 3-hydroxypropyl methacrylate, 4-hydroxybutyl methacrylate, 5-hydroxypentyl methacrylate, 6-hydroxyhexyl methacrylate, 7-hydroxyheptyl methacrylate, and 8-hydroxyoctyl methacrylate. In the monomer unit group b, acrylate monomer units and methacrylate monomer units having monocyclic hydrocarbon groups are particularly preferred to reduce fusion bonding of particles during preparation of the particles A. In addition, styrene based monomers such as styrene, α-methyl styrene, p-methyl styrene, t-butyl styrene, chlorostyrene, chloromethyl styrene, and hydroxymethyl styrene; olefin based monomers such as ethylene and propylene; diene based monomers such as butadiene and isoprene; and amide based monomers such as acrylamide are preferred to adjust the glass transition temperature in an appropriate temperature range and increase the chemical resistance to linear carbonates used as components of nonaqueous electrolytes present in secondary batteries. These may be used singly or two or more thereof may be used in combination at a desired ratio between them.

There are no specific limitations on the polymerization method to be used to prepare the organic resin to form the particles A, and useful methods include, for example, the solution polymerization method, suspension polymerization method, bulk polymerization method, and emulsion polymerization method. Useful polymerization techniques include, for example, ion polymerization, radical polymerization, and living radical polymerization. Through these polymerization processes, an aqueous solution containing a solvent and particles A dispersed therein is obtained. An aqueous solution thus prepared may be used as-obtained or the particles A may be used after separating from the aqueous solution.

Useful emulsifiers to be added in the polymerization process include cationic surface active agents, anionic surface active agent, nonionic surface active agents, and amphoteric surface active agents. These may be used singly or two or more thereof may be used in combination.

Examples of the cationic surface active agents include, for example, alkylpyridinium chloride, alkyltrimethyl ammonium chloride, dialkyldimethyl ammonium chloride, and alkyldimethylbenzyl ammonium chloride.

Examples of the anionic surface active agents include, for example, sodium alkyl sulfate, sodium alkylbenzene sulfonate, sodium dialkylsuccinate sulfonate, sodium alkyl diphenyl ether disulfonate, sodium polyoxyethylene alkyl ether sulfate, and sodium polyoxyethylene alkyl phenyl ether sulfate. Of these, sodium lauryl sulfate, sodium dodecylbenzene sulfonate, sodium polyoxyethylene alkyl ether sulfate, sodium lauryl sulfate and the like are preferred.

Useful nonionic surface active agents include polyoxyethylene alkyl ether, polyoxyethylene alkylaryl ether, polyoxyethylene fatty acid ester, polyoxyethylene sorbitan fatty acid ester. In general, polyoxyethylene nonylphenyl ether, polyoxyethylene octylphenyl ether and the like are used.

Examples of the amphoteric surface active agents include, for example, lauryl betaine, sodium hydroxyethyl imidazoline sulfate, and sodium imidazoline sulfonate.

In addition, useful emulsifiers also include fluorine based surface active agents such as perfluoroalkyl carboxylate, perfluoroalkyl sulfonate, perfluoroalkyl phosphate, perfluoroalkyl polyoxyethylene, perfluoroalkyl betaine, and ammonium perfluoroalkoxyfluorocarboxylate.

Furthermore, so-called reactive emulsifiers that can copolymerize with the aforementioned monomers including, for example, sodium styrenesulfonate, sodium allyl alkyl sulfonate, polyoxyethylene alkyl allyl phenyl ether ammonium sulfate, and polyoxyethylene alkyl allyl phenyl ether can be used, and in particular, the combined use of ammonium 2-(1-allyl)-4-nonylphenoxypolyethylene glycol sulfate and 2-(1-allyl)-4-nonylphenoxypolyethylene glycol is preferred.

Regarding the quantity of these emulsifiers, they preferably accounts for 0.05 mass % or more and 10 mass % or less relative to the total quantity, which accounts for 100 mass %, of the components of the monomer unit group a and monomer unit group b.

Useful polymerization initiators include water-soluble polymerization initiators such as sodium persulfate, potassium persulfate, ammonium persulfate, and hydrogen peroxide, and redox polymerization initiators prepared by mixing these water-soluble polymerization initiators with reducing agents. Of these, potassium persulfate and ammonium persulfate are preferred. Useful reducing agents include, for example, sodium pyrobisulfite, sodium hydrogen sulfite, sodium sulfite, sodium thiosulfate, L-ascorbic acid, salts thereof, sodium formaldehyde sulfoxylate, ferrous sulfate, and glucose. Of these, L-ascorbic acid and salts thereof are preferred.

Regarding the quantity of these polymerization initiators, they preferably accounts for 0.1 mass % or more and 3 mass % or less relative to the total quantity, which accounts for 100 mass %, of the components of the monomer unit group a and monomer unit group b.

It is preferable for the monomer unit in the particles A that belongs to the monomer unit group a to account for 10 mass % or more and 100 mass % or less. The content is more preferably 15 mass % or more and 80 mass % or less, still more preferably 20 mass % or more and 70 mass % or less, and most preferably 25 mass % or more and 60 mass % or less. If it is in the range, adequate adhesion with the electrodes are ensured.

Generally known methods can be useful to measure the content of the monomer unit in the particles A that belongs to the monomer unit group a. For example, the porous layer is first removed from the porous film using an organic solvent such as water and alcohol, and the organic solvent such as water and alcohol is evaporated sufficiently by drying to separate the constituent components present in the porous layer. An organic solvent that can dissolve organic resin components is added to the resulting constituent components so that only the organic resin components are dissolved to separate them from the particles B. Following this, the organic solvent is evaporated from the solution containing the dissolved organic resin components to extract only the organic resin components. The resulting organic resin components are subjected to magnetic nuclear resonance ($^1$H-NMR, $^{19}$F-NMR), infrared absorption spectroscopy (IR), X-ray photoelectron spectroscopy (XPS), X-ray fluorescence analysis (EDX), and elemental analysis to measure the intensity of signals that represent the monomer unit belonging to the monomer unit group a, which is then used for calculation.

The particles referred to herein include not only those having particle shapes, but also those partially in the form of film fused with adjacent particles or binder. There are no specific limitations on their shapes, and actually, they may be, for example, spherical, polygonal, flattened, or fibrous.

It is preferable for the particles A to have an average particle diameter of 0.01 µm or more and 5 µm or less, more preferably 0.05 µm or more and 3 µm or less, and still more preferably 0.08 µm or more and 1 µm or less. If the average particle diameter is 0.01 µm or more, a porous structure will be formed to ensure good battery characteristics. If it is 5 µm or less, the porous layer will have an appropriate thickness to prevent a deterioration in the battery characteristics.

The average particle diameter of particles A was determined by the procedure described below. A field emission type scanning electron microscope (S-3400N™, manufactured by Hitachi, Ltd.) was used to take an image of the surface of a porous layer at a magnification of 30,000 and an EDX image of atoms present only in the inorganic particles in the porous layer containing both inorganic particles and organic resin particles. Each image covers an area having a size of 4.0 µm×3.0 µm. The pixel number was 1,280 pixels×1,024 pixels, and one pixel had a size of 3.1 nm×2.9 nm. In an EDX image, the particles other than the inorganic ones were defined as particles A. Then, for each particle in an image taken, the smallest square or rectangle that completely surrounded the particle was drawn. That is, the edge of the particle was in contact with the four sides of the square or rectangle. For all particles A in the image, the length of a side of the square or the length of a longer side of the rectangle was measured to represent the diameter (or the major axis) and the arithmetic average was calculated to represent their average particle diameter. When the photograph image did not contain 50 or more observable particles, a plurality of images of particles A were taken so that the total number of particles A contained in the plurality of images reached 50 or more, and the arithmetic average of the measurements was adopted as the average particle diameter.

From the viewpoint of the adhesion with electrodes, it is preferable for the particles A to be organic resin particles that are free of inorganic components. If the particles A are organic resin particles, stronger adhesion with electrodes is likely to be achieved.

In addition, the particles A may contain a crosslinking agent. If a crosslinking agent is contained, it enables the production of polymer particles that will not swell significantly with an electrolyte to ensure high electrolyte resistance. The content of such a crosslinking agent is preferably 1 mass % or more and 10 mass % or less relative to the total quantity, which accounts for 100 mass %, of the particles A. It is more preferably 2 mass % or more and less than 10 mass %, still more preferably 3 mass % or more and 9 mass % or less, and particularly preferably 5 mass % or more and 8 mass % or less.

A crosslinkable monomer that can form a crosslinked structure during polymerization will serve as such a crosslinking agent. Examples of the crosslinking agent include monomers having two or more reactive groups in a molecule. More specifically, such crosslinkable monomers include monofunctional monomers having a thermally crosslinkable group and one olefiny double bond in one molecule and polyfunctional monomers having a thermally crosslinkable group and two or more olefiny double bonds in one molecule. Examples of the thermally crosslinkable groups include epoxy group, N-methylolamide group, oxetanyl group, oxazoline group, and combinations thereof.

Examples of a crosslinkable monomer that contains an epoxy group as a thermally crosslinkable group, along with two or more olefiny double bonds in one molecule, include unsaturated glycidyl ethers such as vinyl glycidyl ether, allyl glycidyl ether, butenyl glycidyl ether, and o-allyl phenyl glycidyl ether; diene type or polyene type monoepoxides such as butadiene monoepoxide, chloroprene monoepoxide, 4,5-epoxy-2-pentene, 3,4-epoxy-1-vinyl cyclohexene, and 1,2-epoxy-5,9-cyclododeca diene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl esters of 3-cyclohexene carboxylic acids, and glycidyl esters of 4-methyl-3-cyclohexene carboxylic acids.

Examples of a crosslinkable monomer having an N-methylolamide group as thermally crosslinkable group, along with two or more olefiny double bonds in one molecule, include (meth)acrylamides having a methylol group such as N-methylol (meth)acrylamide.

Examples of a crosslinkable monomer having an oxetanyl group as thermally crosslinkable group, along with two or more olefiny double bonds in one molecule, include 3-((meth)acryloyloxymethyl) oxethane, 3-((meth)acryloyloxymethyl)-2-trifluoromethyl oxethane, 3-((meth)acryloyloxymethyl)-2-phenyl oxethane, 2-((meth)acryloyloxymethyl) oxethane, and 2-((meth)acryloyloxymethyl)-4-trifluoromethyl oxethane.

Examples of a crosslinkable monomer having an oxazoline group as thermally crosslinkable group, along with two or more olefiny double bonds in one molecule, include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of the polyfunctional monomers having two or more olefiny double bonds in one molecule include allyl (meth)acrylate, ethylene di(meth)acrylate, diethylene glycol di(meth)acrylate, triethylene glycol di(meth)acrylate, tetraethylene glycol di(meth)acrylate, trimethylolpropane-tri (meth)acrylate, dipropylene glycol diallyl ether, polyglycol diallyl ether, triethylene glycol divinyl ether, hydroquinone diallyl ether, tetraallyloxy ethane, trimethylolpropane-diallyl ether, allyl or vinyl ethers of other polyfunctional alcohols than those described above, triallyl amine, methylene bisacrylamide, divinylbenzene, alkylene glycol di(meth)acrylate, and urethane acrylate.

Alkylene glycol di(meth)acrylate and urethane acrylate are particularly preferred as crosslinking agents.

The particles A preferably have a glass transition temperature of 10° C. or more and 100° C. or less, more preferably 20° C. or more and 90° C. or less, and still more preferably 30° C. or more and 80° C. or less. If the glass transition temperature is 10° C. or more, it prevents swelling with an electrolyte to ensure good battery characteristics. If it is 100° C. or less, it ensures good adhesion with electrodes. A glass transition temperature in an appropriate range can be realized by selecting a suitable monomer unit from the monomer unit group b. The glass transition temperature can be measured by, for example, differential scanning calorimetry (DSC) according to JIS K7121 (2012) "Method for Measurement of Transition Temperature of Plastics." Specifically, after performing initial heating and cooling, a specimen is heated for the second time, and the glass transition temperature is determined from the intersection between the straight line drawn by extending the baseline in the low temperature range toward the high temperature range and the tangent line to the point where the gradient of the curve in the stepwise glass transition changing portion reaches a maximum.

Particles B

The porous layer contains particles B. The particles B are inorganic particles, and if the porous layer contains inorganic particles, they realize thermal dimensional stability and prevent short circuits from being caused by foreign objects.

Specific examples of the inorganic particles include particles of inorganic oxides such as aluminum oxide, boehmite, silica, titanium oxide, zirconium oxide, iron oxide, and magnesium oxide; particles of inorganic nitrides such as aluminum nitride and silicon nitride; and particles of insoluble ion crystals such as calcium fluoride, barium fluoride, and barium sulfate. Of the various useful materials for the particles B, aluminum oxide is preferred because it increases the strength, and boehmite and barium sulfate are particularly preferred because they serve to prevent abrasion of parts during the particles A and particles B dispersion step. Furthermore, these particles may be used singly, or two or more types of particles may be used as a mixture.

It is preferable for the inorganic particles adopted to have an average particle diameter of 0.05 µm or more and 5.0 µm or less. It is more preferably 0.10 nm or more and 3.0 nm or less, still more preferably 0.20 nm or more and 1.0 nm or less. If it is 0.05 µm or more, it prevents an increase in air permeability to ensure good battery characteristics. However, the pore size will be smaller and accordingly the electrolyte impregnatability will be lower in some instances, possibly having an influence on the productivity. If it is 5.0 µm or less, it serves not only to achieve adequate thermal dimensional stability, but also to allow the porous layer to have an appropriate thickness and prevent a deterioration in the battery characteristics.

The average particle diameter of particles B was determined by the procedure described below. A field emission type scanning electron microscope (S-3400N, manufactured by Hitachi, Ltd.) was used to take an image of the surface of a porous layer at a magnification of 30,000 and an EDX image of atoms present only in the particles B (inorganic particles) in the porous layer containing both inorganic particles and organic resin particles. Each image covers an area having a size of 4.0 µm×3.0 µm. The pixel number was 1,280 pixels×1,024 pixels, and one pixel had a size of 3.1 nm×2.9 nm. Then, for each particle B (inorganic particle) identified in an EDX image taken, the smallest square or rectangle that completely surrounded the particle was drawn. That is, the edge of the particle was in contact with the four sides of the square or rectangle. For all particles B in the image, the length of a side of the square or the length of a longer side of the rectangle was measured to represent the diameter (or the major axis) and the arithmetic average was calculated to represent their average particle diameter. When the photograph image did not contain 50 or more observable particles, a plurality of images of particles B were taken so that the total number of particles B contained in the plurality of images reached 50 or more, and the arithmetic average of the measurements was adopted as the average particle diameter.

The particles to be used may have any appropriate shape such as spherical, plate-like, needle-like, rod-like, and elliptic. In particular, it is preferable for them to be spherical from the viewpoint of surface modification, dispersibility, and coatability.

Binder

The porous layer may contain a binder to allow the particles A and the particles B present in the porous layer to come in close contact with each other and also to allow the particles to come in close contact with the porous base. It is preferable for the binder to be a resin that is electrochemically stable under the conditions where the battery is used. Examples of the binder include binders soluble in organic solvents, water-soluble binders, and emulsion type binders, and they may be used singly or in combination.

In using a binder soluble in an organic solvent or soluble in water, it is preferable for the binder itself to have a viscosity of 10,000 mPa·s or less when the concentration is 15 mass %. It is more preferably 8,000 mPa·s or less, and still more preferably 5,000 mPa·s or less. If it is 10,000 mPa·s or less at a concentration of 15 mass %, it prevents an increase in the viscosity of the coating material and allow the particles A to be localized near the surface to improve the adhesion with electrodes.

In using an emulsion type binder, furthermore, useful dispersing agents include water and organic solvents including alcohol based solvents such as ethanol and ketone based solvents such as acetone, of which the use of a water-dispersed one is preferred from the viewpoint of handleability and miscibility with other components. The emulsion type binder should have a particle diameter of 30 to 1,000 nm, preferably 50 to 500 nm, more preferably 70 to 400 nm, and still more preferably 100 to 300 nm. If the emulsion type binder has a particle diameter of 30 nm or more, it prevents an increase in air permeability to ensure good battery characteristics. If it is 1,000 nm or less, on the other hand, adequate contact will be realized between the porous layer and the porous base.

Resins that can be used as binder material include, for example, polyamide, polyamide-imide, polyimide, polyetherimide, polyvinylidene fluoride, vinylidene fluoride-hexafluoropropylene copolymer, polytetrafluoroethylene, polysulfone, polyketone, polyether ketone, polycarbonate, polyacetal, polyvinyl alcohol, polyethylene glycol, cellulose ether, acrylic resin, polyethylene, polypropylene, polystyrene, and polyurethane. These may be used singly or may also be used as a mixture of two or more thereof.

The content of the binder is 0.5 to 10 mass %, preferably 1 to 8 mass %, and more preferably 2 to 5 mass %, relative to the total mass of the particles A and the particles B. If the content of the binder is 0.5 mass % or more, adequate contact will be realized between the porous layer and the porous base. If it is 10 mass % or less, on the other hand, it prevents an increase in air permeability to ensure good battery characteristics.

Formation of Porous Layer

The porous film is composed mainly of a porous base and a porous layer containing particles A and particles B disposed at least on one side thereof, wherein the particles A contain a polymer having at least one selected from the monomer unit group a that consists of fluorine-containing (meth)acrylate monomer units and silicon-containing monomer units whereas the particles B are inorganic particles. Accordingly, this porous film realizes high thermal dimensional stability and good adhesion with electrodes, along with excellent battery characteristics, and can be produced at low cost. A method of forming the porous layer is described below.

The particles A and the particles B adopted to form the porous layer are dispersed at appropriate concentrations to prepare an aqueous disperse coating liquid. The aqueous disperse coating liquid is prepared by dispersing the particles A and the particles B in a solvent. The solvent to be used to prepare the aqueous dispersed coating liquid contains at least water, and a solvent other than water may be added. There are no specific limitations on such a solvent other than water as long as it does not dissolve the particles A or the particles B and can disperse them in solid states. Examples include organic solvents such as methanol, ethanol, 2-propanol, acetone, tetrahydrofuran, methyl ethyl ketone, ethyl acetate, N-methyl pyrrolidone, dimethyl acetamide, and dimethyl formamide. From the viewpoint of low environmental load as well as safety and economic features, it is preferable to use water or a liquid mixture of water and alcohol.

Furthermore, the coating liquid may contain a binder, film formation assistant, dispersing agent, viscosity improver, stabilization agent, antifoam agent, leveling agent, electrode bonding assistant and the like as required. The addition of a film formation assistant is intended to adjust the film forming property of the particles A and ensure improved contact with the porous base, and specific examples thereof include propylene glycol, diethylene glycol, ethylene glycol, butyl cellosolve acetate, butyl cellosolve, cellosolve acetate, and Texanol. These film formation assistants may be used singly or may also be used as a mixture of two or more thereof. It is preferable for the content of these film formation assistants to be 0.1 mass % or more and 10 mass % or less, more preferably 1 mass % or more and 8 mass % or less, and still more preferably 2 mass % or more and 6 mass % or less, relative to the total quantity of the coating liquid. A content of 0.1 mass % or more ensures sufficient film formation property whereas a content of 10 mass % or less prevents the porous base from being impregnated with the coating liquid during the coating of the porous base with the coating liquid, thereby improving productivity.

Water-dispersed organic particles may be added as an electrode bonding assistant. If organic particles are added, they are likely to interact with the particles A and localize near the surface, possibly leading to improved adhesion between the porous layer and electrodes. Resins that can be used as electrode bonding assistant include, for example, polyvinylidene fluoride, vinylidene fluoride-hexafluoropropylene copolymer, acrylic resin, polyethylene, polypropylene, polystyrene, and polyurethane. It is preferable for the organic particles to have a melting point of 30° C. or more and 150° C. or less, more preferably 40° C. or more and 100° C. or less, and still more preferably 50° C. or more and 90° C. or less. If the melting point is 30° C. or more, it prevents swelling with an electrolyte to ensure good battery characteristics. If it is 150° C. or less, on the other hand, sufficient adhesion with electrodes is ensured.

The particle diameter of the organic particles should be 10 to 500 nm, preferably 20 to 400 nm, more preferably 30 to 300 nm, and still more preferably 50 to 250 nm. If the organic particles has a particle diameter of 10 nm or more, it prevents an increase in air permeability to ensure good battery characteristics. If it is 500 nm or less, on the other hand, they will be localized near the surface, leading to sufficient adhesion.

Generally known methods are useful to achieve dispersion in the coating liquid. Examples include the use of a ball mill, bead mill, sand mill, roll mill, homogenizer, ultrasonic homogenizer, high pressure homogenizer, ultrasonic apparatus, and paint shaker. The dispersion step may be carried out in several stages using a plurality of these mixing and dispersing devices in combination.

Then, a porous base is coated with the resulting coating liquid, dried, and combined with a porous layer. The coating may be achieved by a generally known method. Useful examples include dip coating, gravure coating, slit die coating, knife coating, comma coating, kiss coating, roll coating, bar coating, spray coating, immersed coating, spin coating, screen printing, ink jet printing, pad printing, and other printing techniques. The coating is not limited to these methods, and an appropriate one may be selected to meet preferred conditions relating to the particles A, particles B, binder, dispersing agent, leveling agent, solvent, base material and the like that are to be used. To increase the coatability, furthermore, the surface of the porous base to be coated may be subjected to surface treatment such as, for example, corona treatment and plasma treatment. A porous layer can work effectively if it is provided on at least either side of a porous base, but it is preferable to provide porous layers on both sides to develop good adhesion with electrodes.

To form a porous layer, furthermore, the particles B may be spread first to form a heat resistant layer, followed by spreading the particles A to form an adhesion layer. However, such multi-stage coating will require large cost, and both surfaces of the porous layer will be entirely covered with the particles A, possibly leading to blocking between the two adhesion layers. In addition, it will likely be difficult to extract it from a rolled up core during the production of a secondary battery. Furthermore, it will be necessary to add a binder in a large amount to achieve close contact among the particles B and between the particles B and the porous base, possibly leading to deterioration in battery characteristics, which is not preferred. In comparison with this, if the particles A and the particles B are mixed first so that a porous layer can be formed by spreading only one coating liquid, it not only reduces the required cost, but increases the blocking resistance and easiness of its extraction as a result of the existence of both the particles A and the particles B on the surface of the porous layer. If the particles A can perform a binding function, furthermore, it decreases the amount of the binder additive, leading to good battery characteristics. These facts suggest that the porous layer is formed preferably using one coating liquid prepared in advance by mixing the particles A and the particles B.

In the porous layer, the particles B preferably account for 70 mass % or more and less than 95 mass %, more preferably 80 mass % or more and less than 93 mass %, of the entire porous layer, which accounts for 100 mass %. The content is still more preferably 85 mass % or more and 92 mass % or less. If the particles B in the porous layer account for more than 70 mass %, it ensures a sufficiently high thermal dimensional stability. If the particles B in the porous layer account for 95 mass % or less, on the other hand, it ensures a sufficient content of the particles A, leading to good adhesion with electrodes. The content of the particles B in the porous layer can be measured by an appropriate generally known method. For example, the porous layer is first removed from the porous film using an organic solvent such as water and alcohol, and the organic solvent such as water and alcohol is evaporated sufficiently by drying to separate the constituent components present in the porous layer. After measuring the total mass of the separated constituent components, the constituent components are combusted at a temperature high enough to melt and decompose the organic resin components, followed by determining the mass of only the particles B, i.e., the inorganic component. The content of the particles B in the porous layer can be calculated by the following formula: (mass of particles B/total mass of constituent components)×100.

It is preferable for the thickness of the porous layer to be 1.0 µm or more and 8.0 µm or less. It is more preferably 2.0 µm or more and 6.0 µm or less. It is still more preferably 2.5 µm or more and 5.0 µm or less. The thickness of the porous layer as referred to in a porous film that includes a porous base having a porous layer on one side means the thickness of that porous layer whereas in a porous film that includes a porous base having porous layers on both sides, it means the sum of the thicknesses of the two porous layers. If the thickness of the porous layer is 1.0 µm or more, it ensures a sufficiently high thermal dimensional stability and good adhesion with electrodes. If it is 8.0 µm or less, a porous structure will be formed to ensure good battery characteristics. In addition, it is also advantageous in terms of cost.

For the porous film, the ratio of the air permeability after immersion for 24 hours in a solvent containing at least one of dimethyl carbonate, ethyl methyl carbonate, and diethyl carbonate at 25° C. to that before the immersion is preferably 1.0 or more and 3.0 or less. It is more preferably 1.0 or more and 2.5 or less. It is still more preferably 1.0 or more and 2.0 or less. If it is 1.0 or more, it means that the porous layer of the porous film is swollen with the solvent, ensuring good adhesion with electrodes. If it is 3.0 or less, on the other hand, the swelling prevents a decrease in the ion permeability. The solvent used for the immersion is the linear carbonate present in the nonaqueous electrolyte used in the secondary battery, that is, dimethyl carbonate, ethyl methyl carbonate, or diethyl carbonate. They may be used singly or two or more thereof may be used in combination. They may also be used in combination with a cyclic carbonate such as propylene carbonate, ethylene carbonate, and butylene carbonate. In this example, the linear carbonates of dimethyl carbonate, ethyl methyl carbonate, and diethyl carbonate preferably has a volume content of 20% or more. It is more preferably 35% or more, and still more preferably 50% or more. If the aforementioned volume content 20% or more, it allows the porous layer to have both appropriate swellability and good battery characteristics.

Porous Base

A porous base is a base having pores inside. Examples of useful porous bases include porous films having pores inside, nonwoven fabrics, and porous film sheets of fibrous materials. The porous base is preferably composed mainly of a resin that has electric insulating properties, electric stability, and stability in electrolytes. To develop a shutdown function, it is preferably a thermoplastic resin having a melting point of 200° C. or less. The shutdown function referred to here works, in the event of abnormal heat generation in a lithium ion battery, such that the resin is melted by heat so that the porous structure will be clogged to halt the ion migration, thereby stopping electric discharge.

The thermoplastic resin may be, for example, a polyolefin based resin, and the porous base is preferably a polyolefin based porous base. With respect to the aforementioned polyolefin based porous base, it is more preferably a polyolefin based porous base having a melting point of 200° C. or less. Specific examples of the polyolefin based resin include polyethylene, polypropylene, ethylene-propylene copolymers, and mixtures thereof, which may be in the form of, for example, a monolayer porous base containing 90 mass % or more of polyethylene or a multilayered porous base containing polyethylene and polypropylene.

Useful production methods for such porous bases include a method in which a polyolefin based resin is processed into a sheet, which is then stretched to make it porous and a method in which a polyolefin based resin is dissolved in a solvent such as liquid paraffin and processed into a sheet, followed by removing the solvent to make it porous.

It is preferable for the porous base to have a thickness of 3 µm or more and 50 µm or less, more preferably 5 µm or more and 30 µm or less. If the thickness of the porous base is 50 µm or less, it prevents an increase in the internal resistance of the porous base. If the thickness of the porous base is 3 µm or more, on the other hand, it is possible to produce a porous base and ensure good mechanical characteristics.

The thickness of a porous base can be determined by observing its cross section by microscopy. In a porous base interposed between porous layers, the perpendicular distance between the interfaces of the porous base with the porous layers is measured to represent the thickness of the porous base. Five samples with a size of 100 mm×100 mm were cut out and the central region of each of the five samples was observed to take measurements, followed by calculating their average to represent the thickness of the porous base.

It is preferable for the porous base to have an air permeability of 50 seconds/100 cc or more and 1,000 seconds/100 cc or less. It is more preferably 50 seconds/100 cc or more and 500 seconds/100 cc or less. If the air permeability is 50 seconds/100 cc or more, it develops sufficient mechanical characteristics. If it is 1,000 seconds/100 cc or less, on the other hand, a sufficient ion mobility is ensured to realize good battery characteristics.

Secondary Battery

The porous film can be used suitably for the separators of secondary batteries such as lithium ion battery. A lithium ion battery contains a positive electrode formed by laying a positive electrode active material on a positive electrode collector and a negative electrode formed by laying a negative electrode active material on a negative electrode collector, with a secondary battery separator and an electrolyte interposed between them.

In a positive electrode, a positive electrode material containing an active material, binder resin, and conductive assistant is laid over a collector, and useful active materials include, for example, lithium-containing transition metal oxides such as $LiCoO_2$, $LiNiO_2$, and $Li(NiCoMn)O_2$ having layer-like structures, spinel type manganese oxides such as $LiMn_2O_4$, and iron based compounds such as $LiFePO_4$. A highly oxidation resistant resin can be binder resin. Specific examples include fluorine resin, acrylic resin, and styrene-butadiene resin. Useful conductive assistants include carbon materials such as carbon black and graphite. The collector is preferably in the form of metal foil, and in particular, aluminum foil is used widely.

In a negative electrode, a negative electrode material containing an active material and binder resin is laid over a collector, and useful active materials include, for example, carbon materials such as artificial graphite, natural graphite, hard carbon, and soft carbon, lithium alloy based materials of tin, silicon and the like, metal materials such as Li, and others such as lithium titanate ($Li_4Ti_5O_{12}$). Useful material for binder resin include fluorine resin, acrylic resin, and styrene-butadiene resin. The collector is preferably in the form of metal foil, and in particular, copper foil is used widely.

The electrolyte gives a space in which ions migrate between the positive electrode and the negative electrode in a secondary battery, and it consists mainly of an electrolyte substance dissolved in an organic solvent. Examples of the electrolyte substance include $LiPF_6$, $LiBF_4$, and $LiClO_4$, of which $LiPF_6$ is preferred from the viewpoint of the solubility in organic solvents and the ion conductance. Examples of the organic solvent include ethylene carbonate, propylene carbonate, fluoroethylene carbonate, dimethyl carbonate, diethyl carbonate, and ethylmethyl carbonate, and these organic solvents may be used as a mixture of two or more thereof.

As a method of producing a secondary battery, first an active material and a conductive assistant are dispersed in a binder resin solution to prepare a coating solution for electrode formation and this coating solution is spread over a collector, followed by drying to remove the solvent to provide a positive electrode or a negative electrode. After the drying step, the coat film preferably has a film thickness of 50 μm or more and 500 μm or less. A secondary battery separator is sandwiched between the resulting positive electrode and negative electrode such that it comes in contact with the active material layer of each electrode and then they are enclosed in a covering material such as aluminum laminate film. Subsequently, an electrolyte is injected, and a negative electrode lead and safety valves are attached, followed by sealing the covering material. The secondary battery thus obtained enjoys strong adhesion between the electrodes and the secondary battery separator and good battery characteristics, and can be produced at low cost.

EXAMPLES

Our films, separators and batteries are explained more specifically below with reference to Examples, though it is not limited thereto. The measuring methods used in these Examples are described below.

Measuring Methods (1) Air Permeability

Measurements were taken from the central region of a sample with a size of 100 mm×100 mm according to JIS P 8117(2009) using an Oken type air permeability measuring device (EG01-5-1MR™, manufactured by Asahi Seiko Co., Ltd.). After examining three samples as described above, the measurements taken were averaged and the average value was adopted to represent the air permeability (seconds/100 cc).

(2) Thickness of Porous Layer

A cross section of a sample was cut out using a microtome and the cross section was observed under a field emission type scanning electron microscope (S-800™, manufactured by Hitachi, Ltd., accelerating voltage 26 kV). In the region observed, a point located at the highest position from the interface with the porous base was identified and its height was adopted as the thickness of the porous layer in a single porous layer. When there were two porous layers formed on both sides, the sum was adopted. Measurements were taken from the central region of a sample with a size of 100 mm×100 mm. After examining five specimens as described above, the measurements taken were averaged.

(3) Content of Particles B in Porous Layer

From a 10 cm×10 cm porous film sample, the porous layer was removed using 40 g of water, and then water and organic solvents such as alcohol were evaporated sufficiently by drying to separate the constituent components present in the porous layer. After measuring the total mass separated constituent components, the constituent components were combusted at a temperature high enough to melt and decompose the organic resin components, followed by determining the mass of only the inorganic particles. The content by mass percent of the inorganic particles in the porous layer was calculated by the following formula: (mass of inorganic particles/total mass of constituent components)×100.

(4) External Appearance of Coat Film

A sample with a size of 100 mm×200 mm was put on black drawing paper and its appearance was observed and evaluated according to the criteria below: Coat film having very good appearance: free of streaks or cissing on coat Coat film having good appearance: either streaks or cissing observed slightly on coat Coat film having fair appearance: streaks and cissing observed slightly on coat Coat film having poor appearance: streaks and cissing observed on coat, making evaluation difficult.

(5) Thermal Shrinkage (Thermal Dimensional Stability)

Three samples with a size of 100 mm×100 mm were prepared and the distance between the center of a side and the center of the opposite side was measured in each sample, which was then heat-treated for one hour in an oven at 150° C. under tension-free conditions. After the heat treatment step, the sample was taken out and the distance between the same center points examined before the heat treatment step was measured, followed by calculating the thermal shrinkage by the formula given below. Measurements were taken simultaneously from two positions in each sample and the average of all measurements was calculated to represent the thermal shrinkage (thermal dimensional stability), followed by evaluation as very good when it was less than 10%, good when it was 10% or more and less than 20%, fair when it was 20% or more and less than 40%, and poor when it was 40% or more.

Thermal shrinkage (%)=[(center-to-center distance before heat treatment)−(center-to-center distance after heat treatment)]/(center-to-center distance before heat treatment)×100

(6) Adhesion with Electrode

A 15 mm×100 mm positive electrode containing $Li(Ni_{5/10}Mn_{2/10}Co_{3/10})O_2$ as active material, vinylidene fluoride resin as binder, and acetylene black and graphite as conductive assistants was placed together with a porous film such that the active material and the porous layer were in contact with each other, and they were hot-pressed in a heat roll press machine under the conditions of 0.5 MPa, 100° C., and 0.2 m/min. Then, the film was peeled off manually with tweezers and the adhesive strength was evaluated according to the four-stage criteria given below. Similarly, the adhesive strength between a negative electrode containing graphite as active material, vinylidene fluoride resin as binder, and carbon black as conductive assistant and a porous film was measured, and the measurements taken for the positive electrode and the negative electrode were summed up and averaged to represent the adhesive strength to be used for evaluation.

Excellent adhesive strength: A very large force is required to peel off the electrode from the porous film.

Very good adhesive strength: A fairly large force is required to peel off the electrode from the porous film.

Good adhesive strength: A slightly large force is required to peel off the electrode from the porous film.

Fair adhesive strength: A weak force is required to peel off the electrode from the porous film. Poor adhesive strength: Only a very small force is required to peel off the electrode from the porous film.

(7) Ratio of Change in Air Permeability Between Before and After Immersion in Solvent Three samples with a size of 100 mm×100 mm were prepared and each of them was immersed in 2 g of a solvent containing at least one of dimethyl carbonate, ethyl methyl carbonate, and diethyl carbonate at 25° C. for 24 hours. Subsequently, the sample was taken out and dried and a measurement was taken from a point in the central region of the sample according to JIS P 8117(2009) using an Oken type air permeability measuring device (EG01-5-11VIR™, manufactured by Asahi Seiko Co., Ltd.). The measurements taken from the samples were averaged to represent the air permeability (seconds/100 cm³). Using the air permeability value obtained above in paragraph (1) and the air permeability value taken after the immersion in a solvent, the ratio of change in air permeability after the immersion in a solvent was calculated by the formula below:

Ratio of change in air permeability after solvent immersion=air permeability after solvent immersion/initial air permeability.

(8) Production of Battery

To produce a positive electrode sheet, 92 parts by mass of $Li(Ni_{5/10}Mn_{2/10}Co_{3/10})O_2$ as positive electrode active material, 2.5 parts by mass each of acetylene black and graphite as positive electrode conductive assistants, and 3 parts by mass of polyvinylidene fluoride as positive electrode binder were dispersed in N-methyl-2-pyrrolidone using a planetary mixer to prepare a positive electrode slurry, which was then spread over aluminum foil, dried, and rolled (areal coating weight 9.5 mg/cm²).

This positive electrode sheet was cut to provide a 40 mm×40 mm sample. This step was carried out such that a 5 mm×5 mm tab adhering portion for collector free of an active material layer protruded out of the active material face. An aluminum tab with a width of 5 mm and a thickness of 0.1 mm was attached to the tab adhering portion by ultrasonic welding.

To produce a negative electrode sheet, 98 parts by mass of natural graphite as negative electrode active material, 1 part by mass of carboxymethyl cellulose as viscosity improver, and 1 part by mass of a styrene-butadiene copolymer as negative electrode binder were dispersed in water using a planetary mixer to prepare a negative electrode slurry, which was spread over copper foil, dried, and rolled (areal coating weight 5.5 mg/cm²).

This negative electrode sheet was cut to provide a 45 mm×45 mm sample. This step was carried out such that a 5 mm×5 mm tab adhering portion for collector free of an active material layer protruded out of the active material face. A copper tab of the same size as the positive electrode tab was attached to the tab adhering portion by ultrasonic welding.

Then, the porous film was cut to provide a 55 mm×55 mm sample, and the porous film sample was sandwiched between the positive electrode and the negative electrode prepared above such that the active material layers separated the porous film. In this way, a group of electrodes was prepared such that all positive electrode coated portions were opposed to the negative electrode coated portions. The aforementioned positive electrode, porous film, and negative electrode were wrapped in a 90 mm×200 mm aluminum laminate film and the long sides of the aluminum laminate film were folded. Then, the two long sides of the aluminum laminate film were heat-sealed to form a bag.

A 1:1 (volume ratio) mixed solvent of ethylene carbonate and diethyl carbonate was prepared and a $LiPF_6$ solute was dissolved to a concentration of 1 mole/liter to produce an electrolyte. Then, 1.5 g of the electrolyte was put in the bag of aluminum laminate film and, while performing impregnation under reduced pressure, the short sides of the aluminum laminate film were heat-sealed to provide a laminate type battery.

(9) Electric Discharge Load Characteristics

Test for electric discharge load characteristics was carried out by the following procedure and an evaluation was performed based on discharge capacity retention rate measurements. For laminate type batteries as prepared above, the discharge capacity was measured in electric discharge test performed at 25° C. and 0.5 C, and the discharge capacity was also measured in electric discharge test performed at 10 C, followed by calculating the discharge capacity retention rate as (discharge capacity at 10 C)/(discharge capacity at 0.5 C)×100. Electric charging was performed under constant current charging conditions at 0.5 C and 4.3 V whereas discharging was performed under constant current discharging conditions at 2.7 V. Five laminate type batteries were prepared as described above, and the one giving the maximum discharge capacity retention rate and the one giving the minimum discharge capacity retention rate were excluded, followed by calculating the average of the remaining three measurements to represent the capacity retention rate. The batteries were rated as poor when the discharge capacity retention rate was less than 55%, good when it was 55% or more and less than 65%, and very good when it was 65% or more.

(10) Charge-Discharge Cycle Characteristics

Test for charge-discharge cycle characteristics of laminate type batteries prepared as above was carried out by the following procedure and an evaluation was performed based on discharge capacity retention rate measurements.

1st to 300th Cycle

One cycle consisted of one charge step and one discharge step, and this charge-discharge cycle was repeated 300 times at 25° C. under the charging conditions of constant current charging at 2 C and 4.3 V and the discharging condition of constant current discharging at 2 C and 2.7 V.

Calculation of Discharge Capacity Retention Rate

The discharge capacity retention rate was calculated as (discharge capacity in 300th cycle)/(discharge capacity in 1st cycle)×100. Five laminate type batteries were prepared as described above, and the one giving the maximum discharge capacity retention rate and the one giving the minimum discharge capacity retention rate were excluded, followed by calculating the average of the remaining three measurements to represent the capacity retention rate. The batteries were rated as poor when the discharge capacity retention rate was less than 60%, good when it was 60% or more and less than 70%, and very good when it was 70% or more.

Example 1

In a reaction vessel, 300 parts of ion-exchanged water and 0.2 part of sodium lauryl sulfate were fed and their stirring was started. After adding 0.5 part of ammonium persulfate thereto in a nitrogen atmosphere at 80° C., a monomer mixture consisting of 40 parts of 2,2,2-trifluoroethyl acrylate, 29 parts of cyclohexyl methacrylate, 29 parts of cyclohexyl acrylate, 2 parts of hydroxyethyl methacrylate, 2 parts of sodium lauryl sulfate, and 50 parts of ion-exchanged water was dropped continuously over 4 hours, and the dropping step was followed by polymerization treatment performed for 3 hours to produce a dispersion liquid A containing particles A of organic resin (average particle diameter 150 nm, glass transition temperature 65° C.).

After adding alumina particles (particles of aluminum oxide) with an average particle diameter of 0.4 µm as particles B, water as solvent in the same quantity as the particles B, acrylic resin (water-soluble) as binder up to 3 mass % relative to the particles B, and carboxymethyl cellulose as dispersing agent up to 1 mass % relative to the particles B, they were dispersed using a bead mill to provide a dispersion liquid B.

The dispersion liquid A and the dispersion liquid B were dispersed in water such that the particles B would account for 90 mass % of the porous layer and mixed by a stirring device to provide a coating liquid.

The resulting coating liquid was spread over both surfaces of a polyethylene porous base (with a thickness of 7 µm and an air permeability of 110 seconds/100 cc) using a wire bar and dried in a hot air oven (drying temperature set at 50° C.) until the solvent contained was evaporated to form a porous layer, followed by producing a porous film. Table 1 shows measurements of the resulting porous film including the porous layer thickness, air permeability, coat film appearance, thermal shrinkage (thermal dimensional stability), adhesion with electrodes, ratio of change in air permeability caused by solvent immersion (solvent:diethyl carbonate), electric discharge load characteristics, and charge-discharge cycle characteristics. Examination of the ratio of change in air permeability caused by solvent immersion show that the ratio of change in air permeability was 2.0 when dimethyl carbonate was used as the solvent for immersion and that the ratio of change in air permeability was 2.0 when methyl ethyl carbonate was used as the solvent for immersion. Furthermore, the ratio of change in air permeability was 2.1 when a liquid mixture prepared by dissolving 1.0 mol of lithium hexafluorophosphate ($LiPF_6$) in 1 kg of a 1:1 by volume mixed solvent of ethylene carbonate and diethyl carbonate was used for immersion.

Example 2

Except that the content of the particles B in the porous layer was adjusted to 94 mass %, the same procedure as in Example 1 was carried out to produce a porous film.

Example 3

Except that the content of the particles B in the porous layer was adjusted to 78 mass %, the same procedure as in Example 1 was carried out to produce a porous film.

Example 4

Except that the content of the fluorine-containing acrylate monomer unit in the particles A was adjusted to 30 mass % (30 parts of 2,2,2-trifluoroethyl acrylate, 34 parts of cyclohexyl methacrylate, 34 parts of cyclohexyl acrylate, and 2 parts of hydroxyethyl methacrylate), the same procedure as in Example 1 was carried out to produce a dispersion liquid A containing particles A (average particle diameter 160 nm, glass transition temperature 70° C.) and a porous film.

Example 5

Except that the content of the fluorine-containing acrylate monomer unit in the particles A was adjusted to 85 mass % (85 parts of 2,2,2-trifluoroethyl acrylate, 6.5 parts of cyclohexyl methacrylate, 6.5 parts of cyclohexyl acrylate, and 2 parts of hydroxyethyl methacrylate), the same procedure as in Example 1 was carried out to produce a dispersion liquid A containing particles A (average particle diameter 140 nm, glass transition temperature 55° C.) and a porous film.

Example 6

Except that 1H,1H,5H-octafluoropentyl acrylate was used as a monomer to form the fluorine-containing acrylate monomer unit, the same procedure as in Example 1 was carried out to produce a dispersion liquid A containing particles A (average particle diameter 160 nm, glass transition temperature 60° C.) and a porous film.

Example 7

Except that 2-(perfluorohexyl)ethyl acrylate was used as a monomer to form the fluorine-containing acrylate monomer unit, the same procedure as in Example 1 was carried out to produce a dispersion liquid A containing particles A (average particle diameter 150 nm, glass transition temperature 55° C.) and a porous film.

Example 8

Except that 2-(perfluorooctyl)ethyl acrylate was used as a monomer to form the fluorine-containing acrylate monomer unit, the same procedure as in Example 1 was carried out to produce a dispersion liquid A containing particles A (average particle diameter 160 nm, glass transition temperature 50° C.) and a porous film.

Example 9

Except that 2,2,2-trimethylbenzoyl perfluorooctyl)ethyl acrylate was used as a monomer to form polymethyl methacrylate monomer unit, the same procedure as in Example 1 was carried out to produce a dispersion liquid A containing particles A (average particle diameter 160 nm, glass transition temperature 70° C.) and a porous film.

Example 10

Except that 40 parts of 2,2,2-trifluoroethyl acrylate, 20 parts of cyclohexyl methacrylate, 20 parts of cyclohexyl acrylate, 18 parts of styrene, and 2 parts of hydroxyethyl methacrylate were used as monomers to form the polymer for particles A, the same procedure as in Example 1 was carried out to produce a dispersion liquid A containing particles A (average particle diameter 200 nm, glass transition temperature 75° C.) and a porous film. Table 2 shows measurements of the resulting porous film including porous layer thickness, air permeability, coat film appearance, thermal shrinkage (thermal dimensional stability), adhesion with electrodes, ratio of change in air permeability caused by solvent immersion (solvent:diethyl carbonate), electric discharge load characteristics, and charge-discharge cycle characteristics.

Example 11

Except that 40 parts of 2,2,2-trifluoroethyl acrylate, 29 parts of isobornyl acrylate, 29 parts of isobornyl methacrylate, and 2 parts of hydroxyethyl methacrylate were used as monomers to form the polymer for particles A, the same procedure as in Example 1 was carried out to produce a dispersion liquid A containing particles A (average particle diameter 200 nm, glass transition temperature 80° C.) and a porous film.

Example 12

Except that a dispersion liquid A containing silicone resin particles (silicon-containing monomer unit accounting for 100 mass % of particles A, average particle diameter 2 μm) containing a silicon containing monomer unit (50 mass % of dimethyldimethoxy silane, 50 mass % of dimethoxydimethylphenyl silane) was used as monomer unit belonging to the monomer unit group a, the same procedure as in Example 1 was carried out to produce a porous film.

Example 13

Except that 2,2,2-trifluoroethyl methacrylate was used as a monomer to form the fluorine-containing methacrylate monomer unit, the same procedure as in Example 2 was carried out to produce a dispersion liquid A containing particles A (average particle diameter 160 nm, glass transition temperature 70° C.) and a porous film.

Example 14

Except that 2,2,2-trifluoroethyl methacrylate was used as a monomer to form the fluorine-containing methacrylate monomer unit, the same procedure as in Example 4 was carried out to produce a dispersion liquid A containing particles A (average particle diameter 160 nm, glass transition temperature 70° C.) and a porous film.

Example 15

Polymerization in First Stage

In a reaction vessel, 300 parts of ion-exchanged water and 0.2 part of sodium lauryl sulfate were fed and their stirring was started. After adding 0.5 part of ammonium persulfate thereto in a nitrogen atmosphere at 80° C., a monomer mixture consisting of 49 parts of cyclohexyl methacrylate, 49 parts of cyclohexyl acrylate, 2 parts of hydroxyethyl methacrylate, 2 parts of sodium lauryl sulfate, and 50 parts of ion-exchanged water was dropped continuously over 4 hours, and the dropping step was followed by polymerization treatment performed for 3 hours.

Polymerization in Second Stage

In a reaction vessel, 300 parts of ion-exchanged water, 50 parts (as solid content) of the polymer particles prepared in the first-stage polymerization, and 0.2 part of sodium lauryl sulfate were fed and their stirring was started. After adding 0.5 part of ammonium persulfate thereto in a nitrogen atmosphere at 80° C., a monomer mixture consisting of 50 parts of 2,2,2-trifluoroethyl acrylate, 2 parts of sodium lauryl sulfate, and 50 parts of ion-exchanged water was dropped continuously over 4 hours, and the dropping step was followed by polymerization treatment performed for 3 hours to produce a dispersion liquid A containing particles A of organic resin having a core-shell structure (average particle diameter 150 nm, glass transition temperature 80° C.). Except for using this dispersion liquid A, the same procedure as in Example 1 was carried out to produce a porous film.

Example 16

Except for using boehmite particles with an average particle diameter of 0.4 μm as particles B, the same procedure as in Example 1 was carried out to produce a porous film.

Example 17

Except for using barium sulfate particles with an average particle diameter of 0.3 μm as particles B, the same procedure as in Example 1 was carried out to produce a porous film.

Example 18

In a reaction vessel, 120 parts of ion-exchanged water and 1 part of Adeka Reasoap SR-1025™ (emulsifier manufactured by Adeka Corporation) were fed and their stirring was started. After adding 0.4 part of 2,2'-azobis(2-(2-imidazoline-2-yl) propane) (manufactured by Wako Pure Chemical Industries, Ltd.) thereto in a nitrogen atmosphere, a monomer mixture consisting of 40 parts of 2,2,2-trifluoroethyl methacrylate (3FM), 20 parts of dicyclopentanyl acrylate (TCDA), 38 parts of cyclohexyl acrylate (CHA), 2 parts of hydroxyethyl methacrylate (HEMA), 5 parts of Adeka Reasoap SR-1025™ (emulsifier manufactured by Adeka Corporation), and 115 parts of ion-exchanged water was dropped continuously over 2 hours at 60° C., and the dropping step was followed by polymerization treatment performed for 4 hours to produce a dispersion liquid A containing particles A of organic resin (average particle diameter 190 nm, glass transition temperature 59° C.). Except for using this dispersion liquid A, the same procedure as in Example 1 was carried out to produce a porous film.

Example 19

In a reaction vessel, 120 parts of ion-exchanged water and 1 part of Adeka Reasoap SR-1025™ (emulsifier manufactured by Adeka Corporation) were fed and their stirring was started. After adding 0.4 part of 2,2'-azobis(2-(2-imidazoline-2-yl) propane) (manufactured by Wako Pure Chemical Industries, Ltd.) thereto in a nitrogen atmosphere, a monomer mixture consisting of 30 parts of 2,2,2-trifluoroethyl methacrylate (3FM), 68 parts of cyclohexyl acrylate (CHA), 2 parts of hydroxyethyl methacrylate (HEMA), 9 parts of Adeka Reasoap SR-1025™ (emulsifier manufactured by Adeka Corporation), and 115 parts of ion-exchanged water was dropped continuously over 2 hours at 60° C., and the dropping step was followed by polymerization treatment performed for 4 hours to produce a dispersion liquid A containing particles A of organic resin (average particle diameter 215 nm, glass transition temperature 45° C.). Except for using this dispersion liquid A, the same procedure as in Example 1 was carried out to produce a porous film. Table 3 shows measurements of the resulting porous film including porous layer thickness, air permeability, coat film appearance, thermal shrinkage (thermal dimensional stability), adhesion with electrodes, ratio of change in air permeability caused by solvent immersion (solvent:diethyl carbonate), electric discharge load characteristics, and charge-discharge cycle characteristics.

Example 20

Except for using boehmite particles with an average particle diameter of 0.4 µm as particles B, the same procedure as in Example 19 was carried out to produce a porous film.

Example 21

Except for using barium sulfate particles with an average particle diameter of 0.3 µm as particles B, the same procedure as in Example 19 was carried out to produce a porous film.

Example 22

Except for using an emulsion type acrylic resin binder (average particle diameter: 200 nm) as binder for the dispersion liquid B, the same procedure as in Example 19 was carried out to produce a porous film.

Example 23

Except for using an emulsion type acrylic resin binder (average particle diameter: 200 nm) as binder for the dispersion liquid B and adding polypropylene particles (particle diameter: 100 nm, melting point: 65° C.) up to 0.2 mass % relative to the particles B as organic particles serving as electrode bonding assistant, the same procedure as in Example 19 was carried out to produce a porous film.

Example 24

Except for adding polyethylene particles (particle diameter: 100 nm, melting point: 80° C.) up to 0.2 mass % relative to the particles B as organic particles serving as electrode adhesion assistant, the same procedure as in Example 19 was carried out to produce a porous film.

Example 25

In a reaction vessel, 120 parts of ion-exchanged water and 1 part of Adeka Reasoap SR-1025 (emulsifier manufactured by Adeka Corporation) were fed and their stirring was started. After adding 0.4 part of 2,2'-azobis(2-(2-imidazoline-2-yl) propane) (manufactured by Wako Pure Chemical Industries, Ltd.) thereto in a nitrogen atmosphere, a monomer mixture consisting of 40 parts of 2,2,2-trifluoroethyl methacrylate (3FM), 3 parts of dicyclopentanyl acrylate (TCDA), 48 parts of cyclohexyl acrylate (CHA), 2 parts of hydroxyethyl methacrylate (HEMA), 7 parts of urethane acrylate DP-600BU™ (manufactured by NOF Corporation), 9 parts of Adeka Reasoap SR-1025™ (emulsifier manufactured by Adeka Corporation), and 115 parts of ion-exchanged water was dropped continuously over 2 hours at 60° C., and the dropping step was followed by polymerization treatment performed for 4 hours to produce a dispersion liquid A containing particles A of organic resin (average particle diameter 195 nm, glass transition temperature 52° C.). Except for using this dispersion liquid A, the same procedure as in Example 1 was carried out to produce a porous film.

Example 26

In a reaction vessel, 120 parts of ion-exchanged water and 1 part of Adeka Reasoap SR-1025 (emulsifier manufactured by Adeka Corporation) were fed and their stirring was started. After adding 0.4 part of 2,2'-azobis(2-(2-imidazoline-2-yl) propane) (manufactured by Wako Pure Chemical Industries, Ltd.) thereto in a nitrogen atmosphere, a monomer mixture consisting of 30 parts of 2,2,2-trifluoroethyl methacrylate (3FM), 61 parts of cyclohexyl acrylate (CHA), 2 parts of hydroxyethyl methacrylate (HEMA), 7 parts of urethane acrylate DP-600BU™ (manufactured by NOF Corporation), 9 parts of Adeka Reasoap SR-1025 (emulsifier manufactured by Adeka Corporation), and 115 parts of ion-exchanged water was dropped continuously over 2 hours at 60° C., and the dropping step was followed by polymerization treatment performed for 4 hours to produce a dispersion liquid A containing particles A of organic resin (average particle diameter 185 nm, glass transition temperature 45° C.). Except for using this dispersion liquid A, the same procedure as in Example 1 was carried out to produce a porous film.

Example 27

Except for using an emulsion type acrylic resin binder (average particle diameter: 200 nm) as binder for the dispersion liquid B, the same procedure as in Example 26 was carried out to produce a porous film.

Example 28

Except for using an emulsion type acrylic resin binder (average particle diameter: 200 nm) as binder for the dispersion liquid B and adding polypropylene particles (particle diameter: 100 nm, melting point: 65° C.) up to 0.2 mass % relative to the particles B as organic particles serving as electrode bonding assistant, the same procedure as in Example 26 was carried out to produce a porous film.

Example 29

Except for replacing the DP-600BU™ urethane acrylate (manufactured by NOF Corporation) with the UF-07DF™ urethane acrylate (manufactured by Kyoeisha Chemical Co., Ltd.), the same procedure as in Example 26 was carried out to produce a porous film. Table 4 shows measurements of the resulting porous film including porous layer thickness, air permeability, coat film appearance, thermal shrinkage (thermal dimensional stability), adhesion with electrodes, ratio of change in air permeability caused by solvent immersion (solvent:diethyl carbonate), electric discharge load characteristics, and charge-discharge cycle characteristics.

Except for replacing the DP-600BU™ urethane acrylate (manufactured by NOF Corporation) with the UF-0012™ urethane acrylate (manufactured by Kyoeisha Chemical Co., Ltd.), the same procedure as in Example 26 was carried out to produce a porous film.

Example 31

Except for replacing the DP-600BU™ urethane acrylate (manufactured by NOF Corporation) with the UF-0052™ urethane acrylate (manufactured by Kyoeisha Chemical Co., Ltd.), the same procedure as in Example 26 was carried out to produce a porous film.

Except for replacing the DP-600BU™ urethane acrylate (manufactured by NOF Corporation) with the UF-0146™ urethane acrylate (manufactured by Kyoeisha Chemical Co., Ltd.), the same procedure as in Example 26 was carried out to produce a porous film.

Example 33

Except for replacing the DP-600BU™ urethane acrylate (manufactured by NOF Corporation) with the PDE-600™ alkylene glycol dimethacrylate (manufactured by Kyoeisha Chemical Co., Ltd.), the same procedure as in Example 26 was carried out to produce a porous film.

Example 34

Except for replacing the DP-600BU™ urethane acrylate (manufactured by NOF Corporation) with the ADP-400™ alkylene glycol dimethacrylate (manufactured by Kyoeisha Chemical Co., Ltd.), the same procedure as in Example 26 was carried out to produce a porous film.

Comparative Example 1

In a reaction vessel, 300 parts of ion-exchanged water and 0.2 part of sodium lauryl sulfate were fed and their stirring was started. After adding 0.5 part of ammonium persulfate thereto in a nitrogen atmosphere at 80° C., a monomer mixture consisting of 30 parts of ethyl acrylate, 30 parts of n-butyl acrylate, 30 parts of methacrylic acid, 10 parts of methyl methacrylate, 2 parts of sodium lauryl sulfate, and 50 parts of ion-exchanged water was dropped continuously over 4 hours, and the dropping step was followed by polymerization treatment performed for 3 hours to produce a dispersion liquid A containing particles A of organic resin (average particle diameter 120 nm, glass transition temperature 60° C.). Except for using the resulting dispersion liquid A, the same procedure as in Example 1 was carried out to produce a porous film.

Comparative Example 2

Except for preparing a coating liquid without adding particles B, the same procedure as in Example 1 was carried out to produce a porous film.

Comparative Example 3

Except for preparing a coating liquid without using particles A, the same procedure as in Example 1 was carried out to produce a porous film.

TABLE 1

| | Monomer unit group a | Monomer unit group b | Structure of unit monomer group a and unit monomer group b | Number of fluorine atoms in monomer of group a | Content of monomer group a in particles A (mass %) | Particles B | Content of particles B in porous layer (mass %) | Binder contained in porous layer | Thickness of porous layer (μm) |
|---|---|---|---|---|---|---|---|---|---|
| Example 1 | fluorine-containing acrylate monomer unit | acrylate monomer unit methacrylate monomer unit | copolymer | 3 | 40 | aluminum oxide | 90 | acrylic resin (water-soluble) | 4.0 |
| Example 2 | fluorine-containing acrylate monomer unit | acrylate monomer unit methacrylate monomer unit | copolymer | 3 | 40 | aluminum oxide | 94 | acrylic resin (water-soluble) | 4.0 |
| Example 3 | fluorine-containing acrylate | acrylate monomer unit | copolymer | 3 | 40 | aluminum oxide | 78 | acrylic resin (water- |  4.0 |

TABLE 1-continued

| | | | | | | | | | soluble) | |
|---|---|---|---|---|---|---|---|---|---|---|
| | monomer unit | methacrylate monomer unit | | | | | | | | |
| Example 4 | fluorine-containing acrylate monomer unit | acrylate monomer unit methacrylate monomer unit | copolymer | 3 | 30 | aluminum oxide | 90 | acrylic resin (water-soluble) | 4.0 | |
| Example 5 | fluorine-containing acrylate monomer unit | acrylate monomer unit methacrylate monomer unit | copolymer | 3 | 85 | aluminum oxide | 90 | acrylic resin (water-soluble) | 4.0 | |
| Example 6 | fluorine-containing acrylate monomer unit | acrylate monomer unit methacrylate monomer unit | copolymer | 8 | 40 | aluminum oxide | 90 | acrylic resin (water-soluble) | 4.0 | |
| Example 7 | fluorine-containing aciylate monomer unit | acrylate monomer unit methacrylate monomer unit | copolymer | 13 | 40 | aluminum oxide | 90 | acrylic resin (water-soluble) | 4.0 | |
| Example 8 | fluorine-containing acrylate monomer unit | acrylate monomer unit methacrylate monomer unit | copolymer | 17 | 40 | aluminum oxide | 90 | acrylic resin (water-soluble) | 4.0 | |
| Example 9 | fluorine-containing meth-acrylate monomer unit | acrylate monomer unit methacrylate monomer unit | copolymer | 3 | 40 | aluminum oxide | 90 | acrylic resin (water-soluble) | 4.0 | |

| | Air permeability (sec/100 cc) | Coat film appearance | Thermal shrinkage (thermal dimensional stability) | Adhesion with electrodes | Ratio of change in air permeability caused by immersion in diethyl carbonate | Electric discharge load characteristics | Charge-discharge cycle characteristics |
|---|---|---|---|---|---|---|---|
| Example 1 | 145 | very good | very good | very good | 2.0 | very good | very good |
| Example 2 | 135 | very good | very good | good | 1.8 | very good | very good |
| Example 3 | 155 | very good | good | very good | 2.5 | good | good |
| Example 4 | 140 | very good | very good | good | 2.2 | very good | very good |
| Example 5 | 160 | fair | very good | very good | 1.2 | very good | very good |
| Example 6 | 150 | good | very good | very good | 1.8 | very good | very good |
| Example 7 | 140 | good | very good | very good | 1.5 | very good | very good |
| Example 8 | 150 | fair | good | very good | 1.3 | very good | very good |
| Example 9 | 140 | very good | very good | very good | 1.4 | very good | very good |

TABLE 2

| | Monomer unit group a | Monomer unit group b | Structure of unit monomer group a and unit monomer group b | Number of fluorine atoms in monomer of group a | Content of monomer group a in particles A (mass %) | Particles B | Content of particles B in porous layer (mass %) | Binder contained in porous layer | Thickness of porous layer (μm) |
|---|---|---|---|---|---|---|---|---|---|
| Example 10 | fluorine-containing acrylate monomer unit | acrylate monomer unit methacrylate monomer unit | copolymer | 3 | 40 | aluminum oxide | 90 | acrylic resin (water-soluble) | 4.0 |
| Example 11 | fluorine-containing acrylate monomer unit | acrylate monomer unit methacrylate monomer unit | copolymer | 3 | 40 | aluminum oxide | 90 | acrylic resin (water-soluble) | 4.0 |
| Example 12 | silicon containing monomer unit | — | — | — | 100 | aluminum oxide | 90 | acrylic resin (water-soluble) | 4.0 |
| Example 13 | fluorine-containing methacrylate monomer unit | acrylate monomer unit methacrylate monomer unit | copolymer | 3 | 40 | aluminum oxide | 94 | acrylic resin (water-soluble) | 4.0 |
| Example 14 | fluorine-containing methacrylate monomer unit | acrylate monomer unit methacrylate monomer unit | copolymer | 3 | 30 | aluminum oxide | 90 | acrylic resin (water-soluble) | 4.0 |
| Example 15 | fluorine-containing acrylate monomer unit | acrylate monomer unit methacrylate monomer unit | core shell | 3 | 50 | Aluminum oxide | 90 | acrylic resin (water-soluble) | 4.0 |
| Example 16 | fluorine-containing acrylate monomer unit | acrylate monomer unit methacrylate monomer unit | copolymer | 3 | 40 | boehmite | 90 | acrylic resin (water-soluble) | 4.0 |
| Example 17 | fluorine-containing acrylate monomer unit | acrylate monomer unit methacrylate monomer unit | copolymer | 3 | 40 | barium sulfate | 90 | acrylic resin (water-soluble) | 4.0 |
| Example 18 | fluorine-containing acrylate monomer unit | acrylate monomer unit methacrylate monomer unit | copolymer | 3 | 40 | aluminum oxide | 90 | acrylic resin (water-soluble) | 4.0 |

| | Air permeability (sec/100 cc) | Coat film appearance | Thermal shrinkage (thermal Dimensional stability) | Adhesion with electrodes | Ratio of change in air permeability caused by immersion in diethyl carbonate | Electric discharge load characteristics | Charge-discharge cycle characteristics |
|---|---|---|---|---|---|---|---|
| Example 10 | 140 | very good | very good | very good | 1.4 | very good | very good |
| Example 11 | 135 | very good | very good | good | 2.5 | good | very good |
| Example 12 | 150 | very good | very good | good | 1.0 | very good | very good |
| Example 13 | 135 | very good | very good | very good | 1.9 | very good | very good |
| Example 14 | 140 | very good | very good | very good | 2.1 | very good | very good |

TABLE 2-continued

| | | | | | | | |
|---|---|---|---|---|---|---|---|
| Example 15 | 140 | very good | very good | fair | 3.0 | very good | very good |
| Example 16 | 145 | very good | very good | very good | 2.0 | very good | very good |
| Example 17 | 145 | very good | very good | very good | 2.0 | very good | very good |
| Example 18 | 150 | very good | very good | very good | 1.9 | very good | very good |

TABLE 3

| | Monomer unit group a | Monomer unit group b | Structure of unit monomer group a and unit monomer group b | Number of fluorine atoms in monomer of group a | Content of monomer group a in particles A (mass %) | Particles B | Content of particles B in porous layer (mass %) | Binder contained in porous layer | Thickness of porous layer (μm) |
|---|---|---|---|---|---|---|---|---|---|
| Example 19 | fluorine-containing acrylate monomer unit | acrylate monomer unit methacrylate monomer unit | copolymer | 3 | 30 | aluminum oxide | 90 | acrylic resin (water-soluble) | 4.0 |
| Example 20 | fluorine-containing acrylate monomer unit | acrylate monomer unit methacrylate monomer unit | copolymer | 3 | 30 | boehmite | 90 | acrylic resin (water-soluble) | 4.0 |
| Example 21 | fluorine-containing acrylate monomer unit | acrylate monomer unit methacrylate monomer unit | copolymer | 3 | 30 | barium sulfate | 90 | acrylic resin (water-soluble) | 4.0 |
| Example 22 | fluorine-containing acrylate monomer unit | acrylate monomer unit methacrylate monomer unit | copolymer | 3 | 30 | aluminum oxide | 90 | acrylic resin (emulsion) | 4.0 |
| Example 23 | fluorine-containing acrylate monomer unit | acrylate monomer unit methacrylate monomer unit | copolymer | 3 | 30 | aluminum oxide | 90 | acrylic resin (emulsion) | 4.0 |
| Example 24 | fluorine-containing acrylate monomer unit | acrylate monomer unit methacrylate monomer unit | copolymer | 3 | 30 | aluminum oxide | 90 | acrylic resin (water-soluble) | 4.0 |
| Example 25 | fluorine-containing acrylate monomer unit | acrylate monomer unit methacrylate monomer unit | copolymer | 3 | 40 | aluminum oxide | 90 | acrylic resin (water-soluble) | 4.0 |
| Example 26 | fluorine-containing acrylate monomer unit | acrylate monomer unit methacrylate monomer unit | copolymer | 3 | 30 | aluminum oxide | 90 | acrylic resin (water-soluble) | 4.0 |
| Example 27 | fluorine-containing acrylate monomer unit | acrylate monomer unit methacrylate monomer unit | copolymer | 3 | 30 | aluminum oxide | 90 | acrylic resin (emulsion) | 4.0 |
| Example 28 | fluorine-containing acrylate monomer | acrylate monomer unit methacrylate | copolymer | 3 | 30 | aluminum oxide | 90 | acrylic resin (emulsion) | 4.0 |

TABLE 3-continued

| | | Air permeability (sec/100 cc) | Coat film appearance | Thermal shrinkage (thermal dimensional stability) | Adhesion with electrodes | Ratio of change in air permeability caused by immersion in diethyl carbonate | Electric discharge load characteristics | Charge-discharge cycle characteristics |
|---|---|---|---|---|---|---|---|---|
| Example 19 | | 150 | very good | very good | very good | 1.8 | very good | very good |
| Example 20 | | 145 | very good | very good | very good | 2.0 | very good | very good |
| Example 21 | | 145 | very good | very good | very good | 2.0 | very good | very good |
| Example 22 | | 145 | very good | very good | excellent | 2.1 | very good | very good |
| Example 23 | | 140 | very good | very good | excellent | 2.2 | very good | very good |
| Example 24 | | 150 | very good | very good | excellent | 2.0 | very good | very good |
| Example 25 | | 155 | very good | very good | very good | 1.2 | excellent | excellent |
| Example 26 | | 160 | very good | very good | very good | 1.2 | excellent | excellent |
| Example 27 | | 150 | very good | very good | excellent | 1.2 | excellent | excellent |
| Example 28 | | 150 | very good | very good | excellent | 1.2 | excellent | excellent |

TABLE 4

| | Monomer unit group a | Monomer unit group b | Structure of unit monomer group a and unit monomer group b | Number of fluorine atoms in monomer of group b | Content of monomer group a in particles A (mass %) | Particles B | Content of particles B in porous layer (mass %) | Binder contained in porous layer | Thickness of porous layer (μm) |
|---|---|---|---|---|---|---|---|---|---|
| Example 29 | fluorine-containing acrylate monomer unit | acrylate monomer unit methacrylate monomer unit | copolymer | 3 | 30 | aluminum oxide | 90 | acrylic resin (emulsion) | 4.0 |
| Example 30 | fluorine-containing acrylate monomer unit | acrylate monomer unit methacrylate monomer unit | copolymer | 3 | 30 | aluminum oxide | 90 | acrylic resin (emulsion) | 4.0 |
| Example 31 | fluorine-containing acrylate monomer unit | acrylate monomer unit methacrylate monomer unit | copolymer | 3 | 30 | aluminum oxide | 90 | acrylic resin (emulsion) | 4.0 |
| Example 32 | fluorine-containing acrylate monomer unit | acrylate monomer unit methacrylate monomer unit | copolymer | 3 | 30 | aluminum oxide | 90 | acrylic resin (emulsion) | 4.0 |
| Example 33 | fluorine-containing acrylate monomer unit | acrylate monomer unit methacrylate monomer unit | copolymer | 3 | 30 | aluminum oxide | 90 | acrylic resin (emulsion) | 4.0 |
| Example 34 | fluorine-containing acrylate monomer | acrylate monomer unit methacrylate | copolymer | 3 | 30 | aluminum oxide | 90 | acrylic resin (emulsion) | 4.0 |

TABLE 4-continued

| | unit | monomer unit | | | | | | | |
|---|---|---|---|---|---|---|---|---|---|
| Comparative Example 1 | — | unsaturated carboxylic acid monomer unit acrylate monomer unit methacrylate monomer unit | — | 0 | 0 | aluminum oxide | 90 | acrylic resin (water-soluble) | 4.0 |
| Comparative Example 2 | fluorine-containing acrylate monomer unit | acrylate monomer unit methacrylate monomer unit | copolymer | 3 | 40 | — | 0 | acrylic resin (water-soluble) | 4.0 |
| Comparative Example 3 | — | — | — | 0 | 0 | aluminum oxide | 98 | acrylic resin (water-soluble) | 4.0 |

| | Air permeability (sec/100 cc) | Coat film appearance | Thermal shrinkage (thermal dimensional stability) | Adhesion with electrodes | Ratio of change in air permeability caused by immersion in diethyl carbonate | Electric discharge load characteristics | Charge-discharge cycle characteristics |
|---|---|---|---|---|---|---|---|
| Example 29 | 150 | very good | very good | excellent | 1.2 | excellent | excellent |
| Example 30 | 150 | very good | very good | excellent | 1.2 | excellent | excellent |
| Example 31 | 150 | very good | very good | excellent | 1.2 | excellent | excellent |
| Example 32 | 150 | very good | very good | excellent | 1.2 | excellent | excellent |
| Example 33 | 165 | very good | very good | excellent | 1.1 | excellent | excellent |
| Example 34 | 165 | very good | very good | excellent | 1.1 | excellent | excellent |
| Comparative Example 1 | 150 | very good | very good | poor | 4.0 | very good | very good |
| Comparative Example 2 | 250 | very good | poor | very good | 2.0 | poor | poor |
| Comparative Example 3 | 190 | very good | very good | poor | 1.0 | very good | very good |

The porous films produced in Examples 1 to 34 each include a porous base and a porous layer containing particles A and particles B disposed at least on one side thereof, wherein the particles A contain a polymer having at least one selected from the monomer unit group a that consists of fluorine-containing methacrylate monomer units and silicon-containing monomer units whereas the particles B are inorganic particles, and Table 1 shows that they have sufficient thermal dimensional stability, adhesion with electrodes, and good battery characteristics.

Compared to this, the porous film produced in Comparative Example 1, which does not contain a monomer unit belonging to the monomer unit group a, fails to develop sufficient adhesion with electrodes. The porous film produced in Comparative Example 2, which does not contain particles B, fails to develop sufficient thermal dimensional stability. The porous film produced in Comparative Example 3, which does not contain particles A, fails to develop sufficient adhesion with electrodes.

The invention claimed is:
1. A porous film comprising:
a porous base; and
a porous layer containing particles A and particles B disposed at least on one side thereof, wherein the particles A contain a copolymer containing:
  at least one selected from a monomer unit group a that consists of fluorine-containing (meth)acrylate monomer units and silicon-containing monomer units; and
  at least one monomer unit selected from a monomer unit group b that consists of acrylate monomer units having monocyclic hydrocarbon groups and methacrylate monomer units having monocyclic hydrocarbon groups, and
wherein the particles B are inorganic particles,
wherein the particles B present in the porous layer account for 70 mass % or more and 93 mass % or less of the total quantity, which accounts for 100 mass %, of all constituent components of the porous film, wherein the monomer units selected from the monomer unit group a and present in the particles A account for 25 mass % or more and 80 mass % or less, and wherein the particles A have a glass transition temperature of 30° C. or more and 80° C. or less.

2. The porous film as set forth in claim 1, wherein the particles A are organic resin particles.

3. The porous film as set forth in claim 1, wherein the copolymer of the particles A has a fluorine-containing (meth)acrylate monomer unit.

4. The porous film as set forth in claim 1, wherein a fluorine-containing (meth)acrylate monomer present in the fluorine-containing (meth)acrylate monomer unit has 3 or more and 13 or less fluorine atoms.

5. The porous film as set forth in claim 1, wherein the particles A contains a crosslinking agent accounting for 1 mass % or more and 10 mass % or less.

6. The porous film as set forth in claim 1, wherein a thickness of the porous layers is more than 1.0 μm and 8.0 μm or less.

7. The porous film as set forth in claim 1, wherein a ratio of change in air permeability between before and after immersion for 24 hours in a solvent containing at least one of dimethyl carbonate, ethyl methyl carbonate, and diethyl carbonate at 25° C. is 1.0 or more and 3.0 or less.

8. A secondary battery separator comprising the porous film as set forth in claim 1.

9. A secondary battery comprising a secondary battery separator as set forth in claim 8.

* * * * *